(12) United States Patent
Shan et al.

(10) Patent No.: US 11,081,754 B2
(45) Date of Patent: Aug. 3, 2021

(54) CONTROL MODULAR ASSEMBLY AND SWITCH INCLUDING THE SAME

(71) Applicant: SCHNEIDER ELECTRIC (AUSTRALIA) PTY LTD, Macquarie Park (AU)

(72) Inventors: Fuhua Shan, Shenzhen (CN); Zhen Ma, Shenzhen (CN)

(73) Assignee: SCHNEIDER ELECTRIC (AUSTRALIA) PTY LTD, Macquarie Park (AU)

( * ) Notice: Subject to any disclaimer, the term of this patent is extended or adjusted under 35 U.S.C. 154(b) by 0 days.

(21) Appl. No.: 16/394,707

(22) Filed: Apr. 25, 2019

(65) Prior Publication Data

US 2019/0334135 A1   Oct. 31, 2019

(30) Foreign Application Priority Data

Apr. 28, 2018 (CN) .......................... 201820636200.X

(51) Int. Cl.
*H01M 50/20* (2021.01)
*H02J 7/00* (2006.01)

(52) U.S. Cl.
CPC .............. *H01M 50/20* (2021.01); *H02J 7/007* (2013.01); *H02J 7/0045* (2013.01)

(58) Field of Classification Search
CPC ....... H01M 2/1016; H01M 2010/4271; H01M 10/4257; H01M 50/20; H02J 7/0045; H02J 7/007
See application file for complete search history.

(56) References Cited

U.S. PATENT DOCUMENTS

| | | | |
|---|---|---|---|
| 6,235,420 B1* | 5/2001 | Ng | G06F 1/163 429/100 |
| 2013/0344360 A1* | 12/2013 | Miyajama | H01M 2/0404 429/90 |
| 2017/0208159 A1* | 7/2017 | Romain | H04M 1/0262 |

FOREIGN PATENT DOCUMENTS

EP        0 392 857 A2    10/1990

OTHER PUBLICATIONS

Combined Search and Examination Report dated Oct. 22, 2019 for the corresponding United Kingdom Patent Application No. GB1905772.8 (6 pages).

* cited by examiner

*Primary Examiner* — Olatunji A Godo
(74) *Attorney, Agent, or Firm* — Locke Lord LLP

(57) ABSTRACT

Embodiments of the present disclosure provide a control modular assembly for a switch. The control modular assembly according to embodiments of the present disclosure comprises: a base housing (203) adapted to carry an operating member for controlling the switch and formed with a base housing notch (206) at an edge of the base housing (203); a first battery (100) being rechargeable and operable to be detachably mounted in the base housing (203) through the base housing notch (206), thereby supplying electric power to the operating member; and a second battery (205) arranged within the base housing (203) to supply electric power to the operating member when the first battery (100) is taken out of the control modular assembly (200), wherein the second battery (205) is chargeable by the first battery (100).

11 Claims, 5 Drawing Sheets

CONTROL MODULAR ASSEMBLY AND SWITCH INCLUDING THE SAME

FIELD

Embodiments of the present disclosure relate to a smart switch assembly, and more specifically to a wall smart switch assembly.

BACKGROUND

Usually, a smart switch or an electrical switch is internally provided with a battery adapted to supply electric power to a motor arranged in a control modular assembly of the switch so as to control the operation of the switch.

In a conventional smart switch, the battery for use by an intelligent panel assembly of the switch is usually designed to be mounted directly inside the switch and cannot be removed, similar to integrated batteries for mainstream mobile phones. When the battery fails or is aging merely, the overall performance and service life of the switch will be directly affected since the battery cannot be taken out of the switch for replacement by a new one.

For the reasons stated above, there is a need for an improved solution for the battery of the switch.

SUMMARY

Embodiments of the present disclosure provide an improved control modular assembly for a switch to address the current problems as mentioned above.

An aspect of the present disclosure provides a control modular assembly for a switch. The control modular assembly comprises: a base housing adapted to carry an operating member for controlling the switch and formed with a base housing notch at an edge of the base housing; a first battery being rechargeable and operable to be detachably mounted in the base housing through the base housing notch, thereby supplying electric power to the operating member; and a second battery arranged within the base housing to supply electric power to the operating member when the first battery is taken out of the control modular assembly, wherein the second battery is chargeable by the first battery.

The control modular assembly for the switch according to the present disclosure provides a solution in which the first battery and the second battery are simultaneously mounted in the control modular assembly, wherein the first battery may be taken out of the control modular assembly for being charged and replaced when it ages or fails. When the first battery is being charged, the second battery can supply the needed power without interrupting the operation of the switch, thereby extending the service life of the switch. In this way, the user's expenses are saved and environmental friendliness of the control modular assembly and switch is enhanced.

In some embodiments, the control modular assembly further comprises a metal sheet provided on the base housing and arranged to contact the first battery when the first battery is mounted in the base housing, thereby achieving electrical coupling of the first battery with the second battery.

In some embodiments, an elastic rolled rim is formed at an edge of the metal sheet, a limiting structure is formed at an edge portion of the first battery facing the metal sheet, and when the first battery is mounted in the base housing, the elastic rolled rim abuts against the limiting structure and thus is loaded with a force, so that the first battery is retained in the base housing.

In some embodiments, the limiting structure is of a stepped structure that extends along an entire length of the edge portion of the first battery.

In some embodiments, an elastic member is formed on the base housing, a limiting structure is formed at an edge portion of the first battery facing the elastic member, and when the first battery is mounted in the base housing, the elastic member abuts against the limiting structure and thus is loaded with a force, so that the first battery is retained in the control modular assembly.

In some embodiments, the first battery is released through being pressed to disengage the elastic rolled rim from the limiting structure when the first battery is mounted in the base housing, so that the first battery can be taken out of the control modular assembly.

In some embodiments, the first battery is released through being pressed to disengage the elastic member from the limiting structure when the first battery is mounted in the base housing, so that the first battery can be taken out of the control modular assembly.

In some embodiments, the control modular assembly further comprises a panel adapted to cover the base housing and detachably connected with the base housing.

In some embodiments, a panel notch is formed at a position of the panel corresponding to the base housing notch, and a recess is formed on the first battery and aligned with the panel notch, so that the first battery can be taken out of the control modular assembly by means of a tool that passes through the panel notch and enters into the recess.

In some embodiments, the first battery can be directly taken out of the control modular assembly when the panel is disengaged from the base housing.

In some embodiments, when the first battery is mounted in the base housing, a surface of the first battery adjacent to the base housing notch is coplanar with an edge of the base housing on which the base housing notch is formed.

Another aspect of the present disclosure provides a switch including the control modular assembly according to any of the above embodiments.

BRIEF DESCRIPTION OF THE DRAWINGS

The above and other objects, features and advantages of the embodiments of the present disclosure will become more apparent through the following detailed description with reference to figures which are drawn not certainly in a scale. In the figures, embodiments of the present disclosure are described in an exemplary and non-restrictive manner, in which.

DETAILED DESCRIPTION

Figure 1:
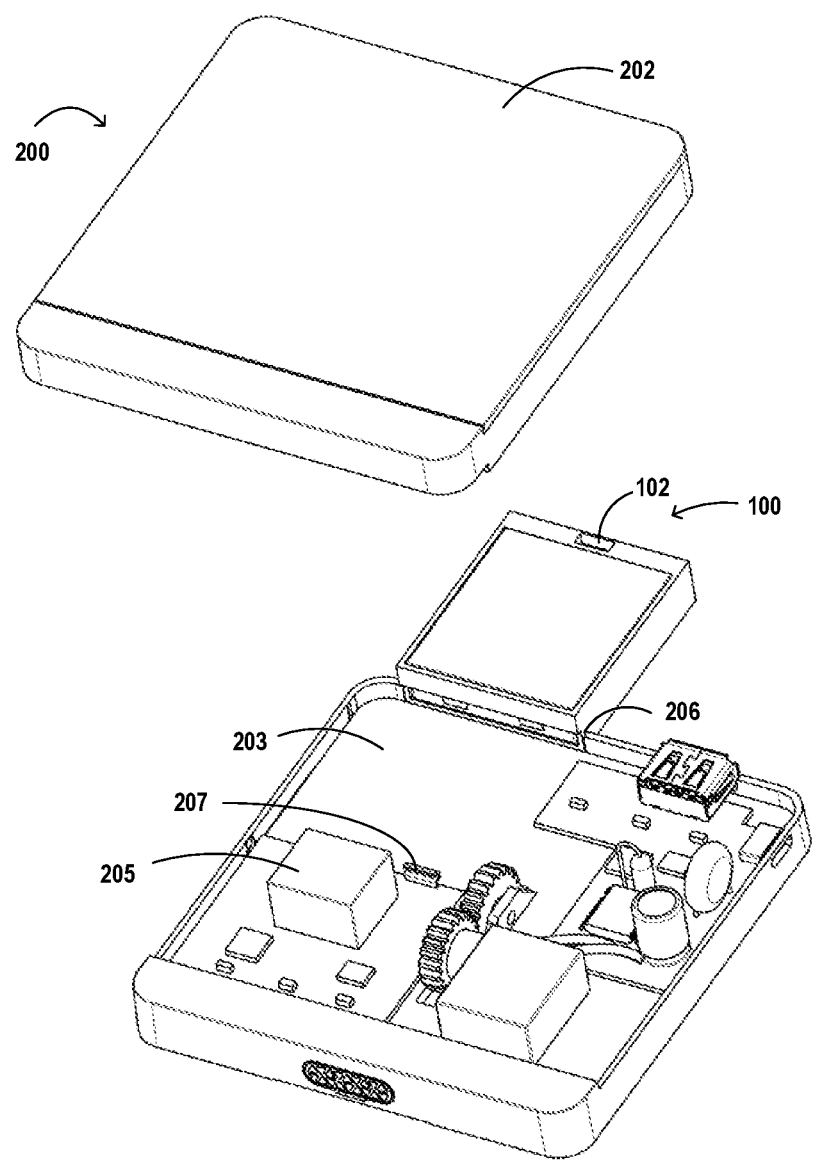
FIG. 1 schematically illustrates an exploded view of a control modular assembly according to an embodiment of the present disclosure.

The concept and configuration of the present disclosure will now be described with reference to various exemplary embodiments illustrated in the drawings. When corresponding embodiments or examples are described with reference to the drawings, terminologies related to directions, such as "up", "down", "vertical", "horizontal (transverse)", "top (portion)" and "bottom (portion)", are used to facilitate a description of embodiments of the present disclosure, either based on directions presented when the reader views the drawings, or based on a normal use direction of the product itself. These directional terminologies would not impose undesired limitations to the protection scope of the present disclosure.

Currently, the integrated battery of the switch has the disadvantage that it cannot be removed for replacement. Therefore, existing intelligent switches are often formed with a charging interface for providing supplemental power to the internal battery. It may be understood that even if the battery itself may be charged, the times of being charged is limited. Thus, the service life of the switch itself will be limited by the service life of the battery. When the battery ages or the charging device of the switch fails, it will inevitably lead to the scrapping of the switch or the difficulties for maintaining the switch. This not only increases the economic burden of the user, but also causes waste of resources.

In addition, even if it is assumed that the battery built into the switch control modular assembly could be taken out of the switch product for being charged, once the battery is removed from the switch, the power supply to the control modular assembly is temporarily interrupted, causing the operation of the switch being temporarily interrupted.

The smart panel switch is a fixed product, for example, it will be installed in the wall of the room. Its life cycle is long and the frequency of use is high. Therefore, the traditional battery design concept provides users with less satisfaction due to the above shortcomings.

Embodiments of the present disclosure provide a solution in which two batteries are simultaneously arranged in the same control modular assembly of a switch, wherein one battery may be easily detached and removed from the control modular assembly for being charged outside of the switch, and the other battery can continue to supply electric power to, for example, a motor of the control modular assembly during said one battery being charged. When the battery, being charged outside of the switch, is reinstalled into the control modular assembly, this battery may not only supply electric power to the switch but also provide supplementary electrical energy to the other battery.

A control modular assembly 200 for a switch according to an embodiment of the present disclosure includes a base housing 203 adapted to carry an operating member for controlling the switch and formed with a base housing notch 206 at an edge of the base housing 203; a first battery 100 being rechargeable and operable to be detachably mounted in the base housing 203 through the base housing notch 206, thereby supplying electric power to the operating member of the switch; and a second battery 205 arranged within the base housing 203 to supply electric power to the operating member in the case that the first battery 100 is taken out of the switch, wherein the second battery 205 is configured to be chargeable by the first battery 100.

Since the first battery 100 is not fixedly mounted in the control modular assembly 200, it can be taken out of the switch for being charged. Therefore, even if the first battery 100 is aged or failed, it is only necessary to re-purchase or replace the first battery 100 without discarding the control modular assembly 200 or the whole switch, thereby reducing the user's economic burden.

FIG. 1 shows an exploded view of an exemplary control modular assembly 200. The position of the first battery 100 shown in the figure may be considered as the first battery being taken out of the control modular assembly 200 or being mounted into the control modular assembly 200.

The control modular assembly 200 includes a base housing 203 and a panel 202 covering the base housing, wherein the panel 202 is detachably connected to the base housing 203. In this case, if the user intends to take the first battery 100 out of the switch for charging, the user may disengage the panel 202 from the base housing 203, and then directly take the first battery 100 out of the switch.

Figure 3:
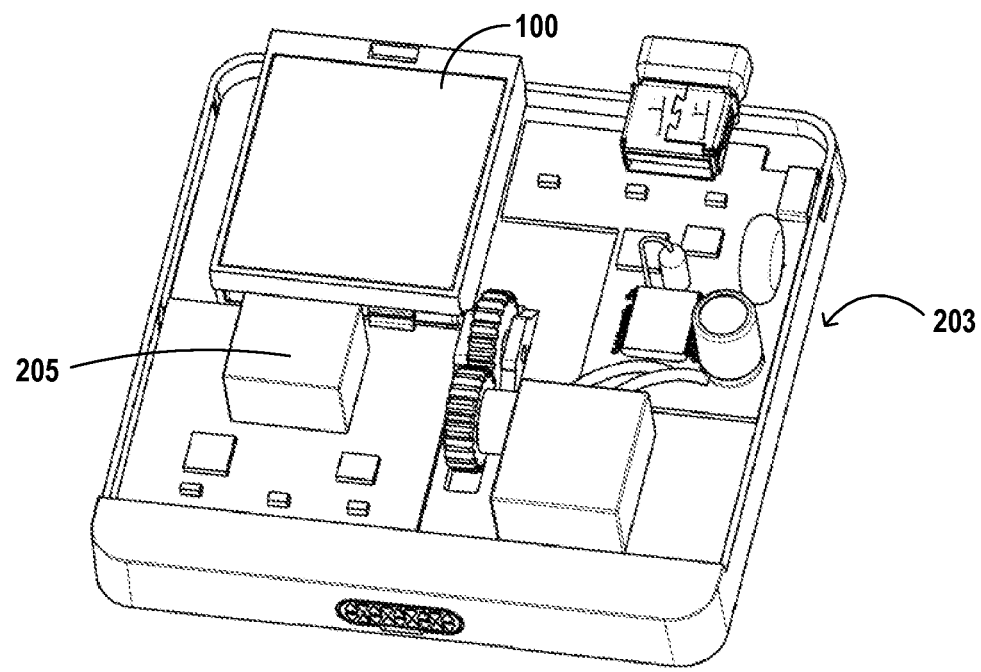
FIG. 3 schematically illustrates an internal configuration of a control modular assembly in which a switch panel is removed, according to an embodiment of the present disclosure.

Referring to FIG. 3, in a state where the first battery 100 is mounted in the base housing 203, the first battery 100 is in electrical contact with a metal sheet 207 formed on the base housing 203 to supply supplementary power to the second battery 205, i.e., charge the second battery. For example, referring to FIG. 6b, a conductive portion 103 is formed at an edge portion of the first battery 100 facing the metal sheet 207, and in the mounted state, the conductive portion 103 directly contacts the metal sheet 207 to form an electrical coupling.

A metal material with good conductivity, such as silver, copper, gold, aluminum, tungsten, nickel or iron, may be selected as the material of the metal sheet 207. If it takes into account the manufacturing cost, a most cost-effective metal material will be selected to form the metal sheet 207.

In an example, an upper edge of the metal sheet 207 may form an elastic rolled rim or folded rim. Correspondingly, an edge portion of the first battery 100 facing the metal sheet 207 forms a limiting structure 104.

Figure 6A:
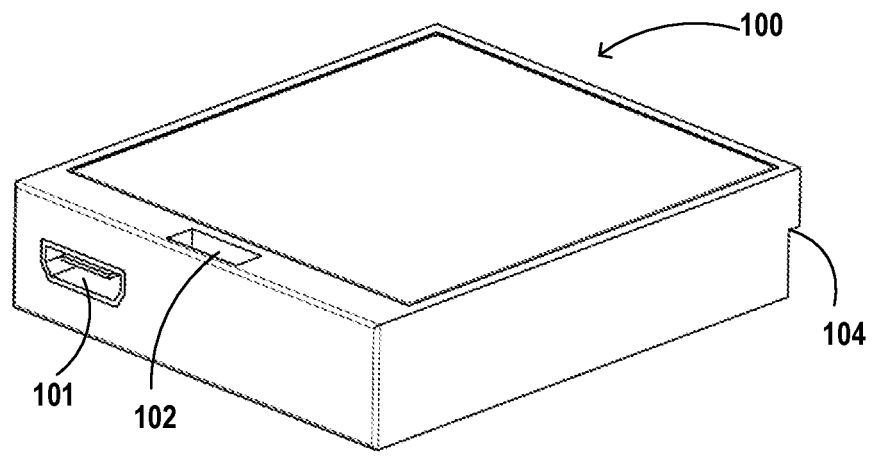
FIG. 6a and FIG. 6b respectively schematically illustrate a first battery according to an embodiment of the present disclosure from different perspectives.
Figure 6B:
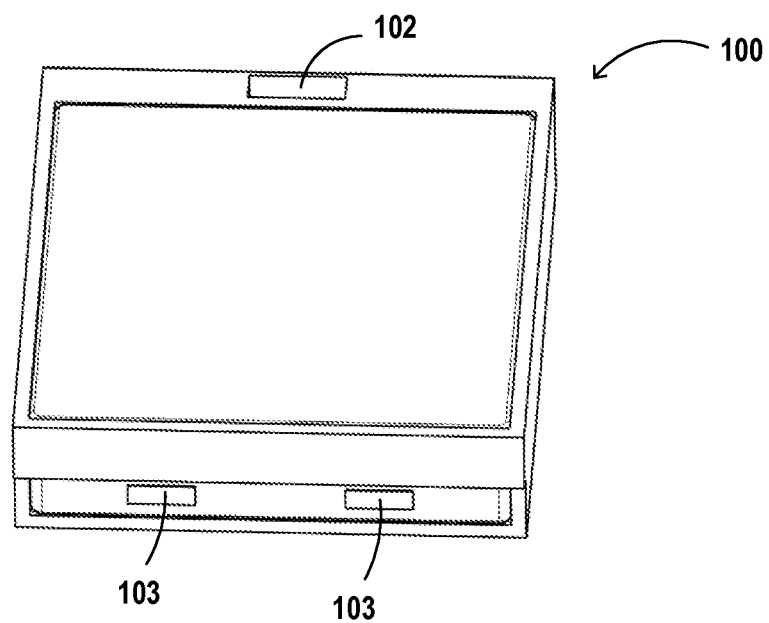

The limiting structure 104 may include a plurality of protrusions intermittently formed on the edge portion. Alternatively, for example, protrusions or other similar structures may be formed only at a position of the edge portion corresponding to the elastic rolled edge or folded edge of the metal sheet 207. In another example, the limiting structure 104 may be of a stepped structure extending along the entire length of the edge portion of the first battery 100 as shown in FIG. 6a. It will be appreciated that the specific form of the limiting structure 104 may be changed according to processing demands, and is not limited to the optional forms described herein.

In a state where the first battery 100 is mounted in the base housing 203, the elastic rolled rim (or folded rim) abuts against the limiting structure 104 and thus is loaded with a force, so that the first battery 100 is relatively fixedly retained on the base housing 203 of the control modular assembly 200 via the force.

In another embodiment, one or more elastic members may be formed on the base housing 203. When the elastic member has a conductive property, it may be separately provided on the base housing 203 instead of the metal sheet 207. In this embodiment, the edge portion of the first battery 100 facing the elastic member forms the limiting structure 104. In a state where the first battery 100 is mounted in the base housing 203, the elastic member abuts against the limiting structure 104 and thus is loaded with a force, so that the first battery 100 is relatively fixedly retained on the base housing 203 of the control modular assembly 200 via the force.

In a further embodiment, if it is necessary to further enhance the retaining force for the first battery 100, one or more additional elastic members may be provided together with the metal sheet 207. In this case, it is conceivable that the metal sheet 207 only functions to form the electrical coupling between the first battery 100 and the second battery 205, so that there is no need to form a structure such as elastic rolled rim or folded rim on the metal sheet, reducing the processing difficulty of the metal sheet 207.

In order to take the first battery 100 out of the control modular assembly 200 for being charged, the following take-out manner may be envisaged for the case that the panel 202 engages with the base housing 203, in addition to the manner that the first battery is directly taken out of the switch in the case that the panel 202 is detached from the base housing 203 as mentioned above.

Generally, in a state where the switch is normally used, especially when the switch is already mounted for example in a wall of a room via its internal functional components, it is undesirable to detach the panel 202 from the base housing 203. Rather, it is desirable to take the first battery 100 out of the switch with the panel 202 and the base housing 203 being engaged with each other, so as to avoid the loss of the panel 202 caused by carelessness of the user.

Figure 2:
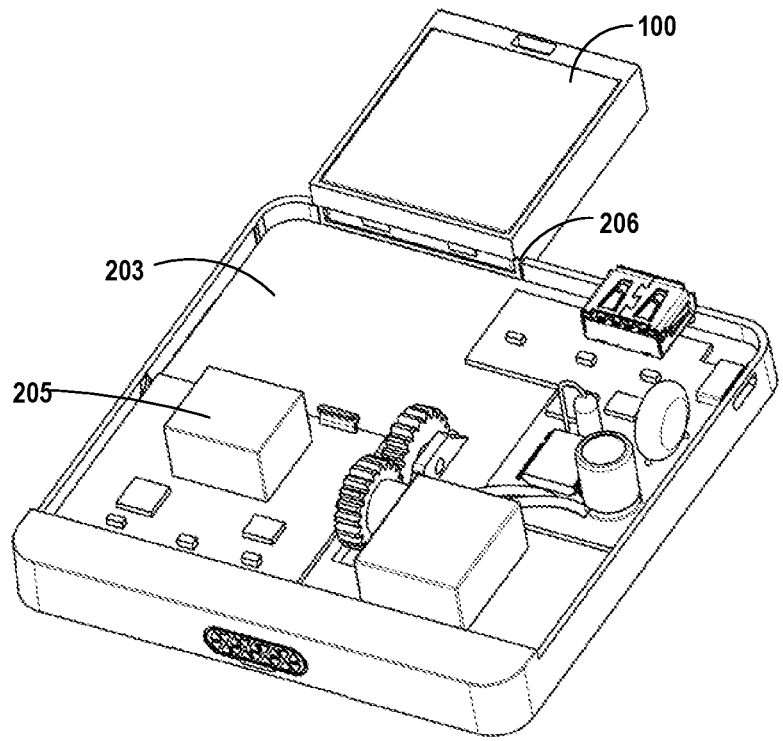
FIG. 2 schematically illustrates a control modular assembly in which a switch panel is removed, according to an embodiment of the present disclosure.

Therefore, a panel notch 204 may be formed at a position of the panel 202 corresponding to the base housing notch 206 (FIG. 2), and a recess 102 may be formed on the first battery 100 (FIG. 1, FIG. 5 and FIGS. 6a-6b). In this way, in a state where the first battery is mounted in the base housing 203 and the panel 202 covers and engages with the base housing 203, the first battery 100 can be removed from the control modular assembly 200 by using a tool (e.g., a tool similar to a card-removing needle for a mobile phone) which can pass through the panel notch 204 to enter the recess 102.

According to an embodiment of the present disclosure, the panel notch 204 and the recess 102 are sized to ensure that the user can use the tool to take out the first battery 100, preferably, for example, implementing this removing manner as conveniently as possible.

Figure 4:
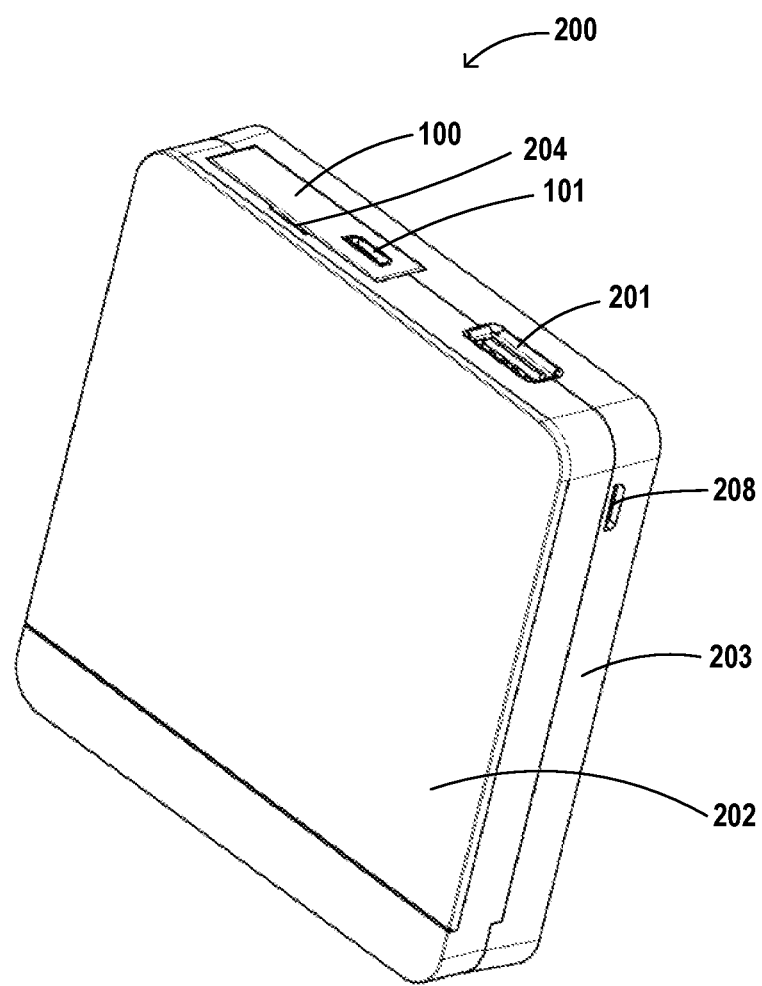
FIG. 4 schematically illustrates a control modular assembly for a switch in a state in which a first battery is installed inside a control modular assembly, according to an embodiment of the present disclosure.
Figure 5:
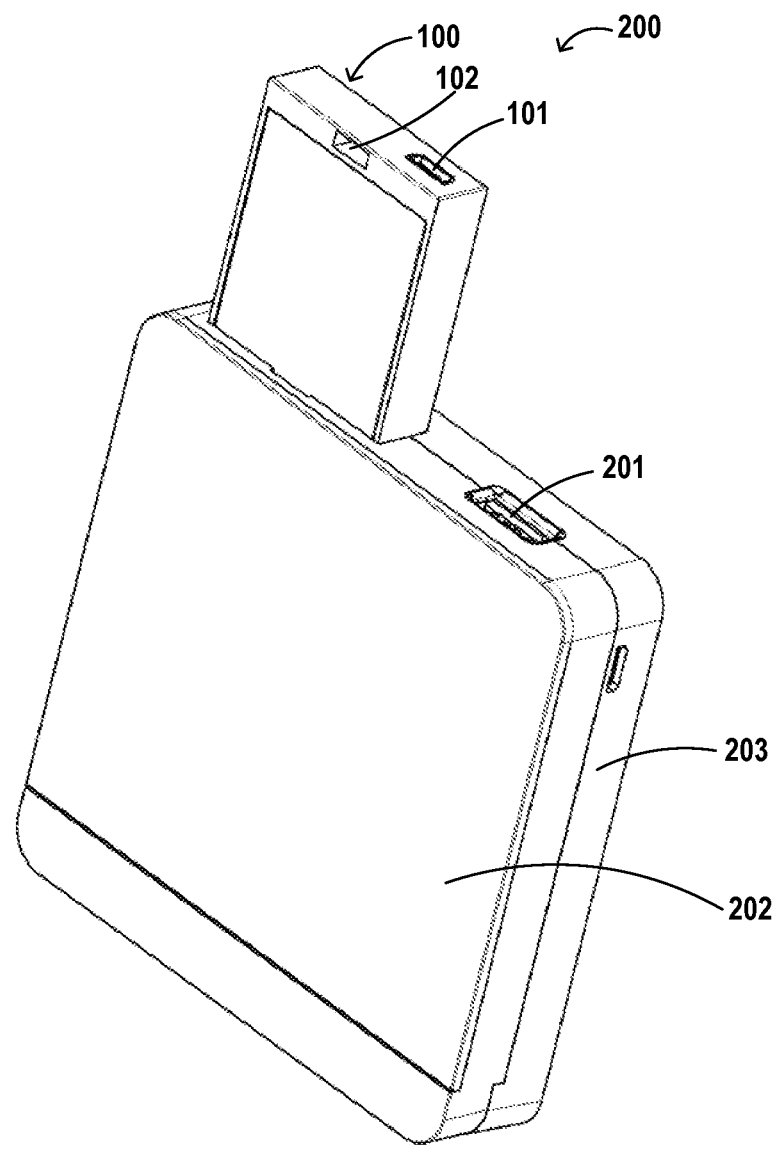
FIG. 5 schematically illustrates a control modular assembly for a switch in a state in which a first battery is being taken out of a control modular assembly or being mounted into the control modular assembly, according to an embodiment of the present disclosure.

According to a further embodiment, in order to take out the first battery 100 from the switch, the user may press an uncovered surface of the first battery 100, as shown in FIG. 4, in a direction toward the interior of the control modular assembly 200, such that when the first battery 100 or its limiting structure 104 further pushes the rolled rim (or folded rim) of the metal sheet 207 or the elastic member, the metal sheet 207 or the elastic member no longer abuts against the limiting structure 104, or disengages from the limiting structure 104, and thus is released by the limiting structure 104, so that the first battery 100 can be taken out of the switch for being charged.

Referring to FIG. 4, in a state where the first battery 100 is mounted in the base housing 203, the surface of the first battery 100 not covered by the base housing 203 is in the same plane as an edge of the base housing 203 on which the base housing notch 206 is formed, thereby providing the switch with a better appearance.

As may be seen in FIG. 4, a charging interface 208 may be additionally formed in a frame of the base housing 203. In the case that the first battery 100 is taken out of the switch and the power is supplied by the second battery 205, even if the second battery 205 unexpectedly has insufficient power, the second battery 205 may be charged via an external charging line coupled to the charging interface 208.

A further aspect of the present disclosure provides a switch comprising the control modular assembly 200 according to any of the preceding embodiments or any suitable combination of these embodiments, and an internal functional component that is mounted, for example, in a wall. For example, referring to FIG. 1, the control modular assembly 200 of the switch may also be formed with for example a standard USB interface or other interfaces 201 for coupling a signal transceiving device of the switch.

Hereinafter, the operation manner of the first battery 100 and the second battery 205 will be described based on the general concept of embodiments of the present disclosure.

When the first battery 100 is low in power, the user may take the first battery 100 out of the control modular assembly 200 in any suitable removal manner described above, and then charge the first battery 100 in any suitable manner via the charging interface 101 (FIG. 4, FIG. 5, FIG. 6a) formed on a body of the first battery 100.

In a state where the first battery 100 has been taken out, only the second battery 205 is retained in the control modular assembly 200 for supplying electrical power to components of the switch, for example, a motor arranged on the base housing 203 of the control modular assembly 200.

When the first battery 100 is fully charged and reinstalled into the control modular assembly 200, that is, in a state where the first battery 100 is again electrically coupled with the second battery 205, the second battery 205 stops supplying power. Then, the first battery 100, instead of the second battery 205, supplies power to the components of the switch, for example, the motor arranged on the base housing 203 of the control modular assembly 200.

In other words, the first battery 100 and the second battery 205 supply power in an alternative way, such that when the first battery 100 is taken out of the switch, or only when the power provided by the first battery 100 is insufficient to drive the switch, the second battery 205 can be utilized to maintain normal operation of the switch.

In addition, it can be appreciated that since the first battery 100 is not fixedly mounted in the control modular assembly 200 but may be freely taken out for being charged, the user only needs to re-purchase or replace the first battery 100 when the first battery 100 is aged or failed without discarding the control modular assembly 200 or the switch, thereby reducing the user's unnecessary cost and providing a pleasant experience.

It should be appreciated that the foregoing description of the embodiments of the present disclosure is only intended to enable those skilled in the art to better understand and further implement the present disclosure, not to limit the extent of protection of the present disclosure in any manner. It should be noted that similar or identical reference numerals may be used in the figures where possible. Similar or identical reference numerals may represent similar or identical functions. Those skilled in the art will readily recognize that alternative embodiments of the structures and methods described herein may be employed without departing from the principles of the present disclosure described herein.

As used herein, the term "comprise" and its various variants may be understood to mean an open term, which means "including but not limited to". The term "based on" may be understood to mean "based at least in part." The term "an embodiment" may be understood to mean "at least one embodiment". The term "another embodiment" may be understood to mean "at least one other embodiment".

References to any prior art in this specification are not, and should not be construed as admitting or implying that these prior art constitute common knowledge.

It should be appreciated that the appended claims are only provisional claims, and are examples of possible claims, and are not intended to limit the scope of claims to any future patent application based on the present application. It is possible to add components to or delete components from example claims in the future to further define or re-define the present disclosure.

We claim:

1. A switch being a fixed product, the switch comprising a control modular assembly comprising:
    a base housing carrying an operating member for controlling the switch and formed with a base housing notch at an edge of the base housing;
    a first battery being rechargeable and operable to be detachably mounted in the base housing through the base housing notch, thereby supplying electric power to the operating member; and
    a second battery arranged within the base housing to supply electric power to the operating member when the first battery is taken out of the control modular assembly, wherein the second battery is charged by the first battery when the first battery is mounted in the base housing and when the second battery needs to be charged.

2. The switch of claim 1, wherein the control modular assembly further comprises a metal sheet provided on the base housing and arranged to contact the first battery when the first battery is mounted in the base housing, thereby achieving electrical coupling of the first battery with the second battery.

3. The switch of claim 2, wherein an elastic rolled rim is formed at an edge of the metal sheet, a limiting structure is formed at an edge portion of the first battery facing the metal sheet, and when the first battery is mounted in the base housing, the elastic rolled rim abuts against the limiting structure and thus is loaded with a force, so that the first battery is retained in the base housing.

4. The switch of claim 3, wherein the limiting structure is of a stepped structure that extends along an entire length of the edge portion of the first battery.

5. The switch of claim 1, wherein an elastic member is formed on the base housing, a limiting structure is formed at an edge portion of the first battery facing the elastic member, and when the first battery is mounted in the base housing, the elastic member abuts against the limiting structure and thus is loaded with a force, so that the first battery is retained in the control modular assembly.

6. The switch of claim 3, wherein the first battery is released through being pressed to disengage the elastic rolled rim from the limiting structure when the first battery is mounted in the base housing, so that the first battery can be taken out of the control modular assembly.

7. The switch of claim 5, wherein the first battery is released through being pressed to disengage the elastic member from the limiting structure when the first battery is mounted in the base housing, so that the first battery can be taken out of the control modular assembly.

8. The switch of claim 1, wherein the control modular assembly further comprises a panel adapted to cover the base housing and detachably connected with the base housing.

9. The switch of claim 8, wherein a panel notch is formed at a position of the panel corresponding to the base housing notch, and a recess is formed on the first battery and aligned with the panel notch, so that the first battery can be taken out of the control modular assembly by means of a tool that passes through the panel notch and enters into the recess.

10. The switch of claim 8, wherein the first battery can be directly taken out of the control modular assembly when the panel is disengaged from the base housing.

11. The switch of claim 1, wherein when the first battery is mounted in the base housing, a surface of the first battery adjacent to the base housing notch is coplanar with an edge of the base housing on which the base housing notch is formed.

* * * * *